Figure 1:
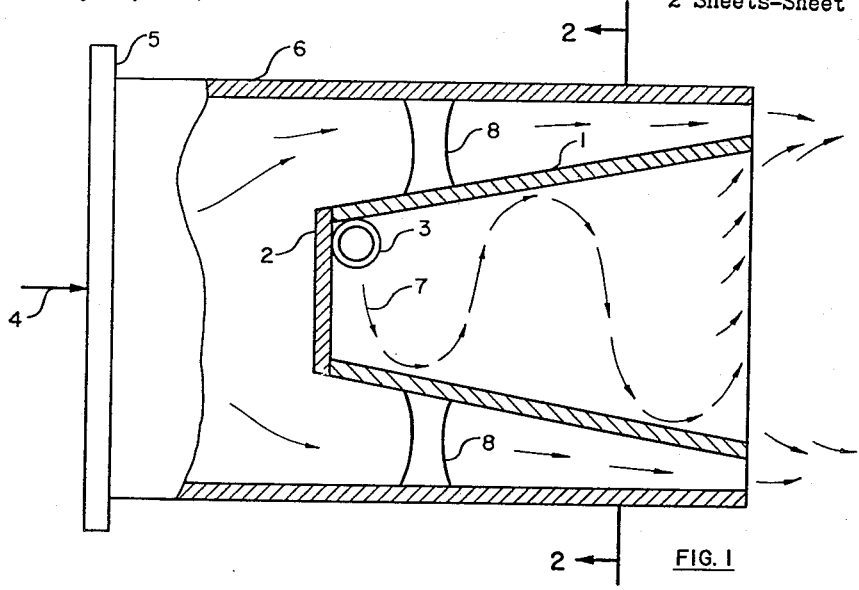

June 29, 1965 H. P. WILLETT 3,191,870
SPRAY NOZZLE
Filed July 25, 1963 2 Sheets-Sheet 1

HOWARD P. WILLETT
INVENTOR.

BY *J. L. Chalsty*
AGENT

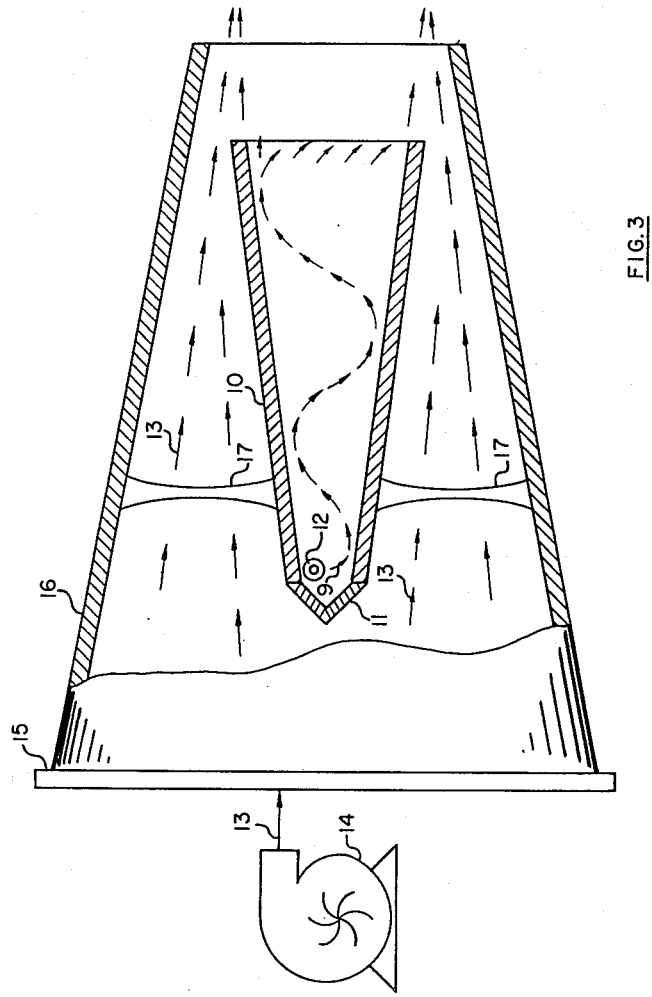

United States Patent Office 3,191,870
Patented June 29, 1965

3,191,870
SPRAY NOZZLE
Howard P. Willett, Darien, Conn., assignor to Chemical Construction Corporation, New York, N.Y., a corporation of Delaware
Filed July 25, 1963, Ser. No. 297,567
7 Claims. (Cl. 239—403)

This invention relates to a spray nozzle for contacting slurries containing a high percentage of solids with a gas stream such as drying air. An improved apparatus is provided, which achieves the complete atomization and dispersal of the slurry into the gas stream.

Numerous types of devices have been suggested in the prior art, for the dispersion of liquid streams into gases. There is no difficulty in atomizing clear liquid and a number of devices are commercially employed for this purpose. However, the atomization of slurries or liquids containing a high percentage of solids is a difficult problem in practice, and none of the commercially available devices are completely adequate for this purpose. The apparatus of the present invention provides a relatively simple yet effective solution to the problem, and achieves a complete dispersion of slurries into gas streams.

The apparatus of the present invention includes an inner conduit into which the incoming slurry is tangentially passed. A whirling circular movement is thus imparted to the slurry. The inner conduit is closed at one end, and is preferably of progressively increasing diameter towards the open end. As the whirling slurry is discharged from the open end of the inner conduit, an outwards component of velocity is provided due to centrifugal force. The increasing diameter of the inner conduit magnifies this effect. A coaxial outer conduit is provided around the inner conduit, and a gas stream is passed through the annular space between the inner conduit and outer conduit. The gas stream is thus discharged into the whirling slurry as it passes out of the inner conduit. Complete dispersal of the slurry into the gas stream thus takes place.

The apparatus of the present invention provides several advantages. The device is relatively simple in nature and construction, yet it is remarkably effective in achieving complete dispersion of a slurry into a gas stream. The device is self-cleaning, and build-up of solids or blockage is completely prevented. The device is applicable for atomization of slurries, drying by evaporation of the liquid component of a slurry, or for chemical reactions involving a gas stream and a solids-laden liquid. No moving parts are present in the device, and consequently abrasive action against elements of the apparatus is minimized.

It is an object of the present invention to provide an improved apparatus for contacting a slurry with a gas stream.

Another object is to provide an apparatus for atomizing a slurry such as a solids-laden liquid stream.

A further object is to provide an apparatus for the evaporation of liquid from a slurry by contact with a gas.

An additional object is to provide an apparatus which projects a slurry into contact with a gas stream in a novel manner.

These and other objects and advantages of the present invention will become evident from the description which follows. Referring to the figures, FIGURE 1 provides an overall axial view of the apparatus, FIGURE 2 is a sectional view of FIGURE 1, taken on section 2—2, and FIGURE 3 is an axial view of a modified form of the apparatus, showing preferred apparatus features.

Figure 2:
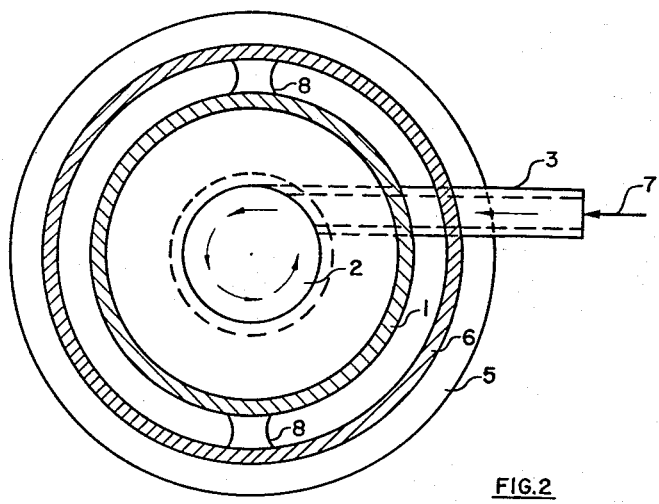

As is apparent from FIGURE 1, the slurry stream 7 is passed into the narrower end of inner conduit 1, which is preferably of progressively increasing diameter towards its open end. It should be understood that inner conduit 1 may alternatively be provided with a constant diameter, since the outward projection of the slurry stream is primarily accomplished by centrifugal force alone. The smaller end of conduit 1 is closed by closure baffle 2. The slurry is tangentially projected into conduit 1 by pipe 3, which is disposed adjacent to baffle 2 and discharges into the inner conduit 1. The slurry thus is provided with a circular whirling motion as it passes through conduit 1, essentially flowing over the inner surface of conduit 1. The slurry is discharged from the open end of conduit 1 with a whirling circular flow pattern, and in addition the slurry has an outward component of velocity due to centrifugal force and the progressively increased diameter of conduit 1.

A stream 4 consisting of atomizing gas such as air is passed via flanged connection 5 into outer conduit 6, which is coaxial with inner conduit 1. The air stream 4 is diverted by closure baffle 2 into the annular space between conduits 1 and 6, and is accelerated in velocity due to the constriction in flow path. The air stream is thus projected out of space between conduits 1 and 6 with high velocity, and atomizes the whirling slurry discharged from within inner conduit 1. A complete dispersion of the slurry 7 into the gas stream is thus attained, with rapid attainment of reaction equilibrium between the gas stream and the slurry. The gas-slurry mixture may be subsequently separated into gaseous and residual slurry components by conventional means, not shown.

The inner conduit 1 is supported within outer conduit 6 by support brackets 8. Other equivalent means for suspending inner conduit 1, such as an inner axial bracket extending external to flange 5, will occur to those skilled in the art. In addition, other equivalent structural elements within the scope of the present invention may obviously be provided. Thus for example, baffle 2 may be rounded or conical in shape, so as to provide more uniform gas flow with reduced turbulence.

Other alternatives within the scope of the present invention may also be mentioned. Thus, outer conduit 6 may be tapered with successively diminishing diameter in the downstream direction. Thus, a greater constriction would be provided at the gas outlet. This configuration is desirable in promoting increased velocity of the gas stream. In addition, conduit 6 may extend beyond the outlet of inner conduit 1, so as to restrict the initial zone of gas-slurry contact. This alternative is of benefit in some instances, however, in general this configuration may be less desirable since a less complete interaction between the gas stream and the slurry is attained in some cases, depending on relative stream velocities.

These alternative arrangements are illustrated in FIGURE 3.

Referring to FIGURE 3, the slurry stream 9 is passed tangentially into the narrower closed end of inner conduit 10, which is preferably of progressively increasing diameter towards its open end. It should be noted that inner conduit 10 may alternatively be provided with a constant diameter, since the outward projection of the slurry stream is primarily accomplished by centrifugal force alone. The smaller end of conduit 10 is closed by closure baffle 11, which is conical in shape in order to provide more uniform gas flow with reduced turbulence. The slurry is tangentially projected into conduit 10 by pipe 12, which is disposed adjacent to baffle 11 and tangential to conduit 10, and discharges slurry tangentially into the conduit 10. The slurry stream 9 is thus provided with a circular whirling motion as it passes through conduit 10, essentially flowing over the inner surface of conduit 10. The slurry is discharged from the open end of conduit 10 with a whirling circular flow pattern, and in addition the slurry has an outward component of velocity due to centrifugal force and the progressively increased diameter of conduit 10.

A stream 13 consisting of atomizing gas such as air is generated by conventional generating means such as blower 14, and is passed via flanged connection 15 into outer conduit 16, which is coaxial with inner conduit 10. The air stream 13 is diverted by closure baffle 11 into the annular space between conduits 10 and 16, and is accelerated in velocity due to the constriction in flow path. The flow path constriction is provided by the coaction between conduits 10 and 16, with inner conduit 10 being of progressively increasing diameter and outer conduit 16 being of progressively decreasing diameter, in the direction of gas flow. Conduit 16 is also extended and terminates beyond the open end of conduit 10, thus directing the air stream into more complete mixing with the slurry being discharged from the open end of conduit 10. The air stream is thus projected out of the space between conduits 10 and 16 with high velocity, and atomizes the whirling slurry discharged from the open end of conduit 10. A complete dispersion of the slurry 9 into the gas stream 13 is thus attained, with rapid attainment of re